(No Model.)
J. J. MANN.
SIDE BEARING FOR RAILWAY CARS.
No. 400,236. Patented Mar. 26, 1889.
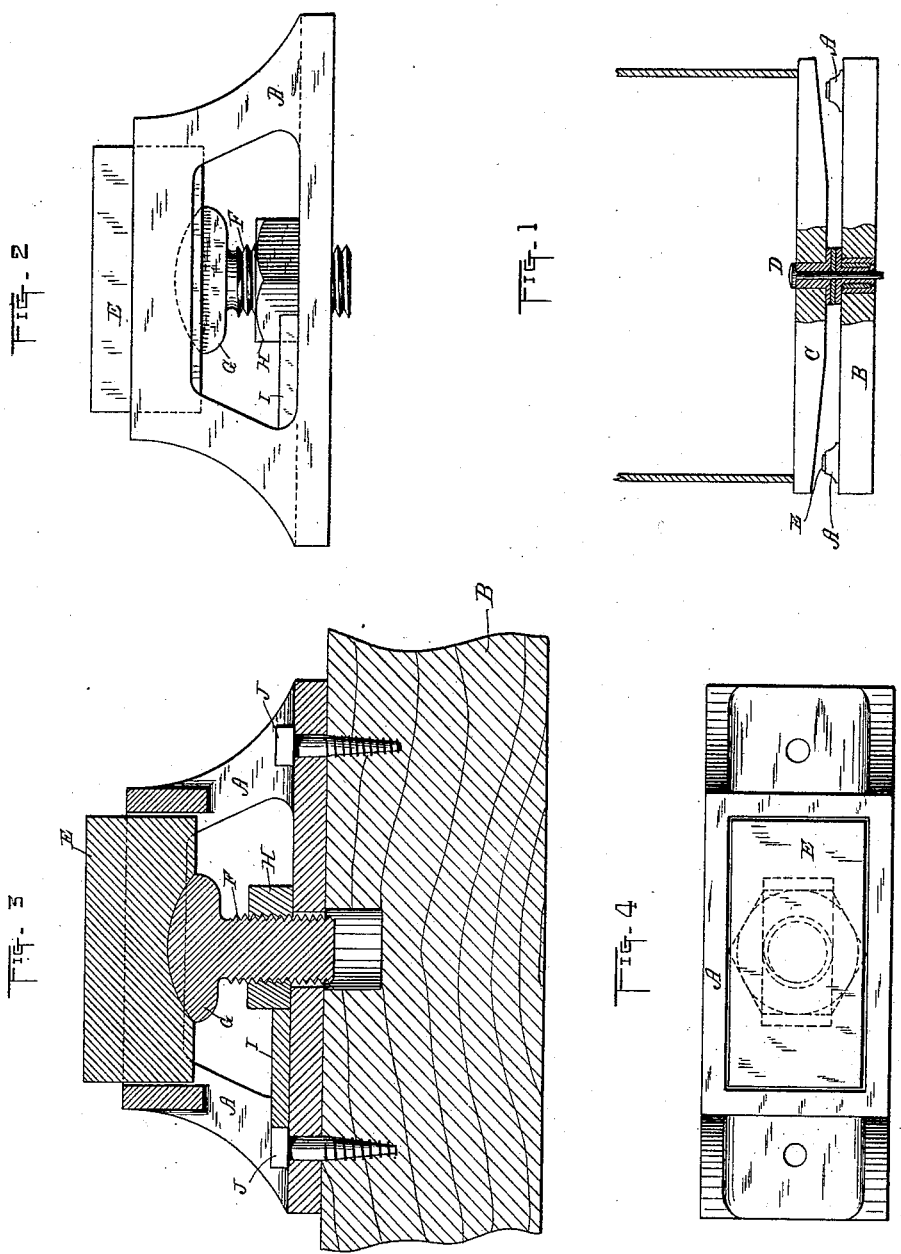
WITNESSES:
Raphael Netter
Robt. F. Taylor
INVENTOR,
John J. Mann

UNITED STATES PATENT OFFICE.

JOHN J. MANN, OF NEW YORK, N. Y.

SIDE BEARING FOR RAILWAY-CARS.

SPECIFICATION forming part of Letters Patent No. 400,236, dated March 26, 1889.

Application filed November 8, 1888. Serial No. 290,277. (No model.)

*To all whom it may concern:*

Be it known that I, JOHN J. MANN, of the city, county, and State of New York, have invented certain new and useful Improvements in Side Bearings for Railway-Cars, of which the following is a full and accurate description, reference being had to the accompanying drawings.

This invention relates to the side bearings of cars—that is, to the bearings arranged between the cars and their trucks, and which are designed to prevent the car swaying or rocking too far on its trucks or axles. These bearings are usually placed on the bolster or like part of the trucks and at both sides of the central points thereof, where the car is attached to the trucks. It is well understood that the car is normally off these bearings, and is supported mainly at the center of the trucks, which is essential to permit the truck or axle to assume the various angular positions due to the curves and inclines of the road-bed. Though these side bearings are to arrest the car when it rocks or careens too far, they, by reason of their small surface, still permit the axles to have angular motion when the car is bearing upon them. As the distance between the side bearing-surfaces of the car and the corresponding surfaces on the trucks is slight, it will be readily understood that the great wear a car is subjected to will often cause the bearings, when the car is attached to the truck, to so wear away that the car may rest almost wholly upon its side bearings. When this condition exists, so much of the weight of the car may be thrown upon its side bearings as to cause the truck to stick, or at least to have angular motion only when under very heavy pressure, and this obviously dangerously strains and twists the wheels and axles, and not only causes the running mechanism to rapidly wear out, but often breaks the wheels or axles. Heretofore whenever a car has been found to rest too heavily upon its side bearings it was necessary to remove it from the road and fix it with new or readjust its bearings.

My invention has for its object to provide cars with side bearings readily capable of vertical adjustment, so that the proper space between the side bearing-surfaces of the car and the corresponding surfaces of its trucks may be maintained during the life of the car and while it is in use.

My invention consists, therefore, of a side bearing for railway-cars and vehicles generally, the bearing-surface of which is vertically adjustable.

Referring to the drawings, Figure 1 is a diagram view of the body of a vehicle and the bolster of its truck, showing in a general way the position of the side bearings when in use. Fig. 2 is an elevation view of a side bearing and its frame. Fig. 3 is a longitudinal section of the same. Fig. 4 is a plan view of the same.

In these views, A represents the bearing or the frame portion thereof, B the bolster or other like cross-beam of the truck, and C the bolster or cross-timber of the body of the car. It is to be understood that the car is centrally connected to the trucks, as at D, which may be the king-bolt, and that the body of the car may have a slight rocking motion laterally, tending to bring the ends of the beam B and timber C together. Upon each end of the beam B is placed one of the bearings A, the bearing-surface of which is nearly in contact with the timber C. The frame A is shaped to inclose a vertically-moving block, E, which is the part that the car-body strikes upon. Just beneath this block is a screw, F, which has a rounded and extended head, G, that enters a correspondingly-shaped recess in the block E. This screw passes through a nut, H, which rests upon the bed-plate of the frame A, the screw extending freely down through a hole in such plate.

I is a key that holds the nut from turning, and to this end abuts against the head of one of the screws J, being also held laterally in place by the sides of the frame A. The whole device is held in place upon the bolster by the screws J, or in any other suitable manner.

To effect the adjustment of the bearing surface or block, the key will be lifted out and the nut turned in the proper direction to cause the screw under the adjustable block to raise or lower such block. When the desired adjustment has been made, the key will be replaced and the nut held from further turning. By these means whenever a car is found to rest too heavily upon its side bearings the bearing-surfaces may be promptly and easily readjusted, and particularly while the car is in use, thus obviating all danger incident to running a car with its axles or trucks bound or sticking to the body of the car, and thereby opposed as to their requisite angular motion.

What is claimed as new is—

1. In combination with the body of a car and its truck, side bearings arranged between the truck and the car and provided with vertically-adjustable bearing-surfaces.

2. In a side bearing for railway-cars, the combination of a frame inclosing a vertically-adjustable bearing-block with an adjusting-screw supported on said frame and beneath said block.

3. In a side bearing for railway-cars, the combination of a frame inclosing a vertically-moving bearing-block with a screw for vertically adjusting the block, a nut for supporting and operating the screw, and a key for securing said nut against rotation.

JOHN J. MANN.

Witnesses:
H. G. COOPER,
LOUIS N. WIENECKE.